US00RE38076E

(19) United States
(12) Reissued Patent
Brennan, Jr. et al.

(10) Patent Number: US RE38,076 E
(45) **Date of Reissued Patent: *Apr. 15, 2003**

(54) STACKABLE PALLET

(75) Inventors: James F. Brennan, Jr., Moorestown, NJ (US); Martin Clive-Smith, Leek Wootton (GB)

(73) Assignee: Lock Nest, L.L.C., East Riverton, NJ (US)

( * ) Notice: This patent is subject to a terminal disclaimer.

(21) Appl. No.: 10/057,527

(22) Filed: Nov. 13, 2001

Related U.S. Patent Documents

Reissue of:
(64) Patent No.: 5,983,806
Issued: Nov. 16, 1999
Appl. No.: 09/143,961
Filed: Aug. 31, 1998

U.S. Applications:

(63) Continuation of application No. 08/835,320, filed on Apr. 7, 1997, now Pat. No. 5,799,585.
(60) Provisional application No. 60/028,899, filed on Oct. 21, 1996.

(51) Int. Cl.[7] ..... B65D 19/38
(52) U.S. Cl. ..... 108/53.1; 206/499; 206/503; 220/1.5; 248/346.02
(58) Field of Search ..... 108/51.11, 53.1, 108/53.3, 57.28, 57.32, 57.33; 206/499, 503; 220/1.5, 756

(56) References Cited

U.S. PATENT DOCUMENTS

| | | | |
|---|---|---|---|
| 4,099,640 | A | 7/1978 | Nessfield et al. |
| 4,162,737 | A | 7/1979 | Clive-Smith |
| 4,319,732 | A | 3/1982 | Godfrey |
| 4,355,732 | A | 10/1982 | Nessfield |
| 4,638,744 | A | 1/1987 | Clive-Smith |
| 4,834,000 | A | 5/1989 | Darnell et al. |
| 4,875,814 | A | 10/1989 | Weller |
| 4,911,318 | A | 3/1990 | Bishop |
| 4,964,349 | A | 10/1990 | Bishop |
| 5,275,301 | A | 1/1994 | Clive-Smith |
| 5,398,832 | A | 3/1995 | Clive-Smith |
| 5,494,182 | A | 2/1996 | Clive-Smith |

*Primary Examiner*—Janet M. Wilkens
(74) *Attorney, Agent, or Firm*—Norman E. Lehrer

(57) ABSTRACT

A stackable pallet comprises a rectangular planar base member which has two opposing ends and two opposing sides. Extending into one of the ends of the base member is a recess which is defined by two side edges and a transverse edge. A pair of smooth curved members extend downwardly from the other end of the base member. A pair of spaced apart elongated beams extend downwardly from the base member between the ends of the same. A handle member is pivotally secured to the base member between the side edges of the recess. The handle member is adapted to be pivoted from an inoperative position, wherein the handle member is folded on top of the base member, to an operative position, wherein the handle member extends upwardly from the base member.

17 Claims, 3 Drawing Sheets

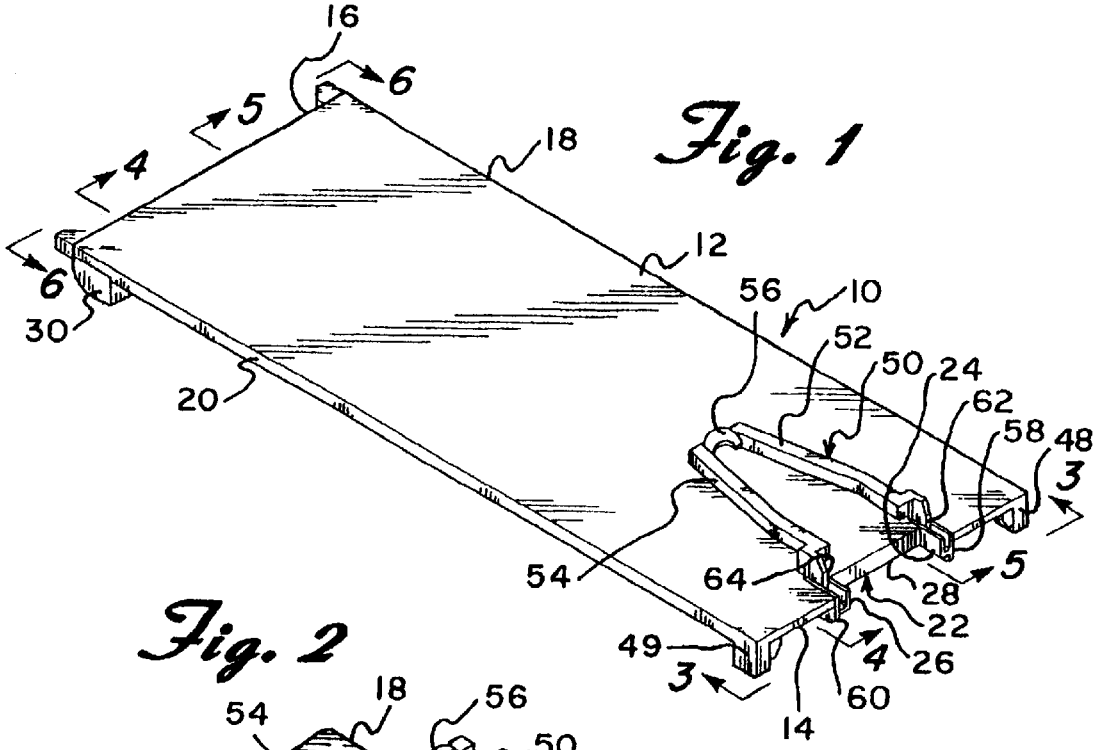
Fig. 1
Fig. 2
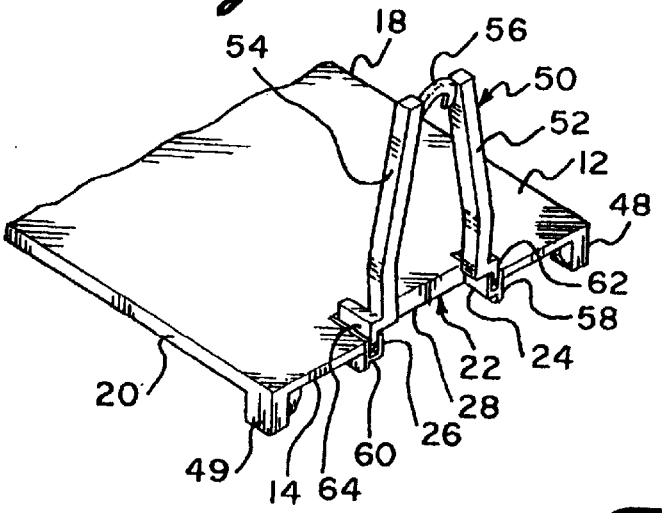
Fig. 3
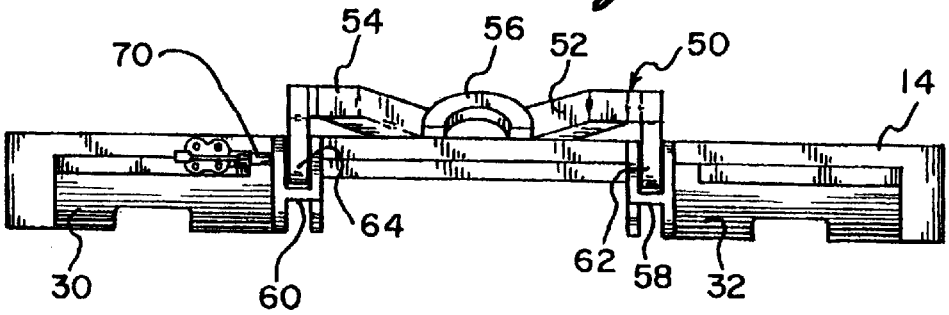

STACKABLE PALLET

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of U.S. application Ser. No. 08/835,320, filed Apr. 7, 1997, now U.S. Pat. No. 5,799,585, which prior application claims the benefit of U.S. Provisional Patent Application Ser. No. 60/028,899, filed Oct. 21, 1996.

BACKGROUND OF THE INVENTION

The present invention is directed toward a stackable pallet and, more particularly, to such a pallet which is adapted to be inserted into an open end of a shipping container and which can be compactly stacked on top of an adjacent pallet when not in use.

In order to transport a plurality of packaged goods it is common to first place the goods on top of an article supporting platform or pallet which includes a substantially planar support surface. Such pallets are required to comply with I.S.O. Standards promulgated by the International Standards Organization. U.S. Pat. No. 4,834,000 shows an example of that kind of pallet. Once the pallet is loaded, it is pushed or pulled into a shipping container to be carried by a truck, ship, train or plane. Such pallets are typically rather large and are adapted to support loads of several tons. Accordingly, specialized loading vehicles, e.g. PLS (pallet load and unload system) trucks, are utilized to either push or pull the loaded pallet into the cargo area of the shipping vehicle or container.

Existing article supporting platforms often include a pair of opposing end walls. U.S. Pat. Nos. 4,099,640, 4,162,737, 4,355,732, 4,638,744, 4,911,318, 4,964,349, 5,275,301, 5,398,832, 5,494,182 disclose examples of such platforms. It is desirable for the end walls of the article supporting platforms to be placed in a collapsed condition after the goods are unloaded from the same so that a plurality of platforms can be stacked on top of one another. The stacking of the platforms is important for the convenient storage and transportation of the same. In order to position a platform of the type described above in the collapsed condition, the end walls are typically folded inwardly so that they rest on top of the planar support surface of the platform. Accordingly, when a similarly collapsed platform is stacked on top of an adjacent collapsed platform, the end walls of the lower platform frequently interfere with the proper alignment of the upper platform which is positioned on top of the same.

Another problem which typically arises when stacking a plurality of planar platforms on top of one another, whether or not they have end walls, is that they cannot be readily fastened to one another. This makes transportation of the stacks difficult.

Even further, a stack containing a plurality of platforms is quite heavy and is cumbersome to transport. However, the stack typically does not include means for allowing a conventional PLS truck to readily engage the stack so that it can be pushed or pulled to a desired location.

SUMMARY OF THE INVENTION

The present invention is designed to overcome the deficiencies of the prior art discussed above. It is an object of this invention to provide a pallet which can be efficiently stacked on top of adjacent pallets when not in use.

It is a further object of the invention to provide a pallet which includes a handle member pivotally attached to one end of the pallet to facilitate transportation of the same by a conventional PLS truck.

It is yet another object of the invention to provide a pallet which complies with the I.S.O. standards set forth by the International Standards Organization.

In accordance with the illustrative embodiments, demonstrating features and advantages of the present invention, there is provided a stackable pallet which comprises a rectangular planar base member. The base member has two opposing ends and two opposing sides. Extending into one of the ends of the base member is a recess which is defined by two side edges and a transverse edge. A pair of smooth curved members extend downwardly from the opposite end of the base member. A pair of spaced apart elongated beams extend downwardly from the base member between the ends of the same. A handle member is pivotally secured to the base member between the side edges of the recess. The handle member is adapted to be pivoted from a stored position, wherein the handle member is folded on top of the base member, to an operative position, wherein the handle member extends upwardly from the base member. The handle member is so configured and dimensioned to fit between the elongated beams of the pallet positioned directly above so as not to interfere with the ability to stack a plurality of pallets on top of each other.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a stackable pallet constructed in accordance with the principles of the present invention;

FIG. 2 is a partial perspective view of the present invention showing the handle member in the upright position;

FIG. 3 is an end view taken along lines 3—3 of FIG. 1;

DETAILED DESCRIPTION OF THE PREFERRED EMBODIMENT

Figure 4:
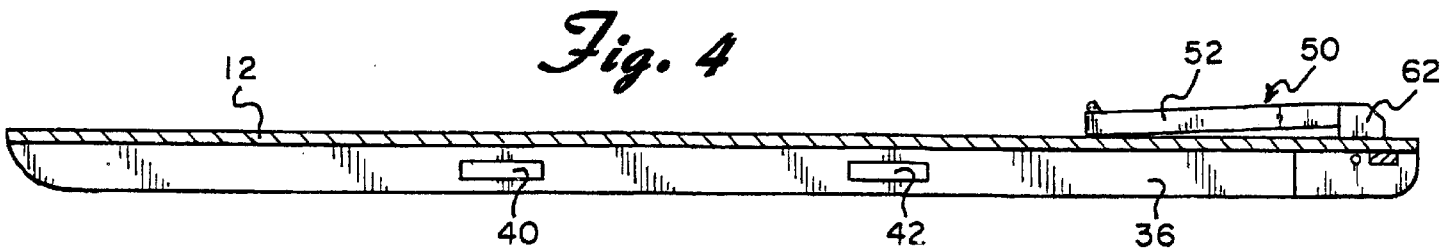
FIG. 4 is a cross-sectional view taken along lines 4—4 of FIG. 1.

Referring now to the drawings in detail wherein like reference numerals have been used throughout the various figures to designate like elements, there is shown in FIG. 1 a stackable pallet constructed in accordance with the principles of the present invention and designated generally as 10.

The stackable pallet 10 includes a rectangular planar base member 12 which, as can clearly be seen in the figures, has a width and a length. The base member has a first end 14, a second end 16, and two opposing sides 18 and 20. Extending into the first end 14 of the base member 12 is a recess 22. The recess 22 is defined by two side edges 24 and 26 and a transverse edge 28. The base member 12 is preferably about 585 cm long, 230 cm wide, and 12.5 cm high.

Figure 6:
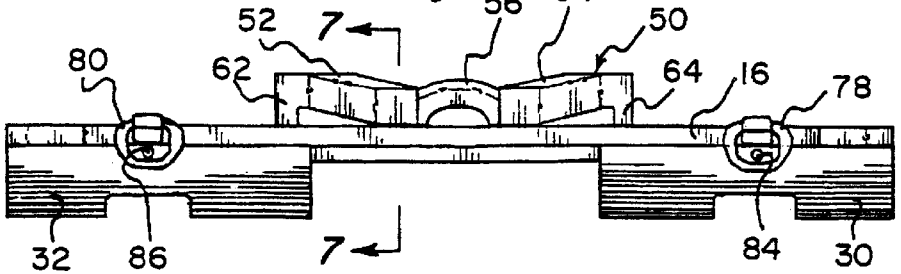
FIG. 6 is an end view taken along lines 6—6 of FIG. 1.

Slider pads in the form of smooth curved segments 30 and 32 extend downwardly from the bottom of the base member 12 adjacent the second end 16 thereof (FIG. 6). Each slider pad is positioned adjacent a different one of the sides 18 and 20 of the base member 12. The curved segments or slider pads facilitate the sliding of the pallet when the first end 14 of the base member 12 is raised by a conventional PLS truck and transported across a surface such as the floor of a shipping container as more fully described below. Although the use of slider pads is preferred in connection with the present invention, it should be readily apparent more conventional roller means could also be utilized in place of the slider pads. The purpose of the slider pads or roller means is to reduce the friction between the second end 16 of the pallet 10 and the container floor or other support surface as the pallet is being moved by the PLS truck.

Figure 5:
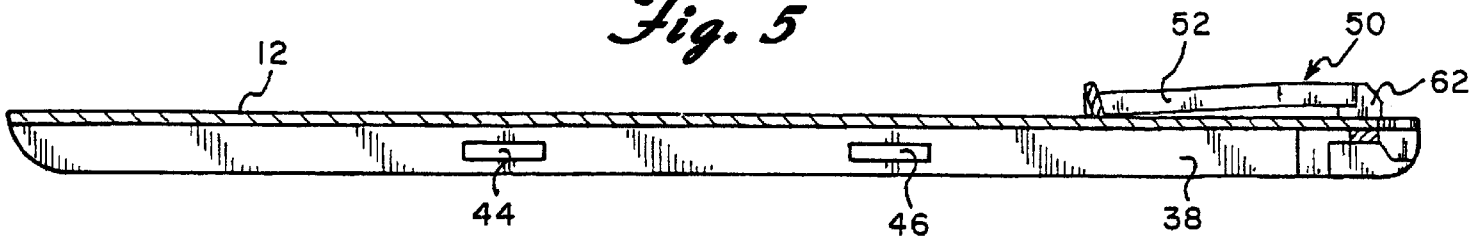
FIG. 5 is a cross-sectional view taken along lines 5—5 of FIG. 1.
Figure 7:
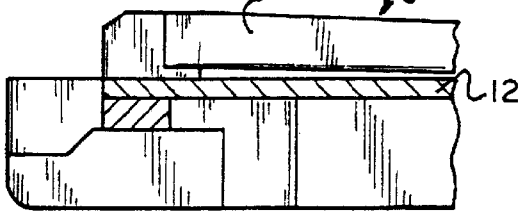
FIG. 7 is a cross-sectional view taken along lines 7—7 of FIG. 6.

A pair of elongated steel beams or grinders 36 and 38 extend downwardly from the bottom of the base member between the first and second ends thereof (FIGS. 4 and 5). The elongated beams are spaced equally on either side of a longitudinal centerline of the base member and are preferably located about 900 mm from one another. As shown in FIGS. 4 and 5, the elongated beams 36 and 38 extend throughout a substantial length of the base member 12. The base member 12 is supported on the elongated beams 36 and 38. The end of each of the beams located adjacent the second end 16 of the base member 12 is preferably curved so that when the first end 14 is lifted by a PLS truck and the weight of the pallet is placed on the curved segments 30 and 32, the beams do not contact the ground and interfere with the transportation of the pallet.

In the preferred embodiment, each of the elongated beams has two openings 40, 42 and 44, 46, respectively, therein. Opening 40 in beam 36 is preferably aligned with opening 44 of beam 38 and opening 42 is preferably aligned with opening 46. Such alignment of the openings allows the pallet to be readily lifted by a fork lift truck. Specifically, each tine of the fork lift truck is passed through the aligned openings so that the truck can lift the pallet.

In the preferred embodiment, two feet 48 and 49 are provided, each of which extends downwardly from a different one of the sides 18 and 20 of the base member 12 adjacent the first end 14 thereof (FIG 1). The curved segments 30, 32, the feet 48, 49 and the elongated beams 36, 38 extend downwardly from the base member an equivalent distance in order to sufficiently support the base member 12 on a support surface.

A handle member 50 is secured adjacent the first end 14 of the base member 12 as more fully described below. The handle member 50 includes a pair of converging arms 52 and 54. The converging ends of the arms are joined by a curved connecting segment 56.

Secured to the base member 12 adjacent each of the side edges 24 and 26 of the recess 22 are bracket supports 58 and 60. A pair of L-shaped brackets 62 and 64 are provided, each of which is pivotally secured in a corresponding one of the bracket supports by means of a pivot pin (not shown). Each of the free ends of the handle member 50 is secured to a corresponding one of the L-shaped bracket members. The L-shaped brackets 62 and 64 allow the handle member 50 to be moved from an inoperative folded position, wherein said handle member 50 is folded on top of the base member 12 (FIG. 1), to an operative upright position, wherein the handle member 50 extends upwardly from the base member 12 (FIG. 2). It should be noted that the distance the elongated beams extend downwardly from the bottom of the base member is greater than the thickness of the handle member in order to allow the pallets to be compactly stacked on top of one another as more fully described below.

If desired, locking means may be provided for releasably locking the handle member 50 in the upright position. The locking means may be in the form of a sliding bolt 70 or the like which cooperates with an opening in the bracket 64.

Two spaced apart eyelets 78 and 80 are pivotally secured to the second end 16 of the base member 12. The eyelets are adapted to move from an upright configuration, wherein they extend upwardly from the base member, to a folded configuration, wherein they extend downwardly from the base member (FIG. 6). A pin 84 extends outwardly from the curved support member 30 and a pin 86 extends outwardly from the curved support member 32. When eyelet 78 is placed in the folded configuration, pin 84 projects through the same. Similarly, when eyelet 80 is placed in the folded configuration pin 86 projects through the same.

Two additional eyelets are secured adjacent the first end 14 of the base member 12. The eyelets allow the pallet to be lifted by a crane or other lifting device. Specifically, one end of a plurality of lines can be secured to each of the eyelets. The other end of each of the lines can be secured to the lifting device in order to allow the pallet 10 to be lifted and readily transported.

Figure 9:
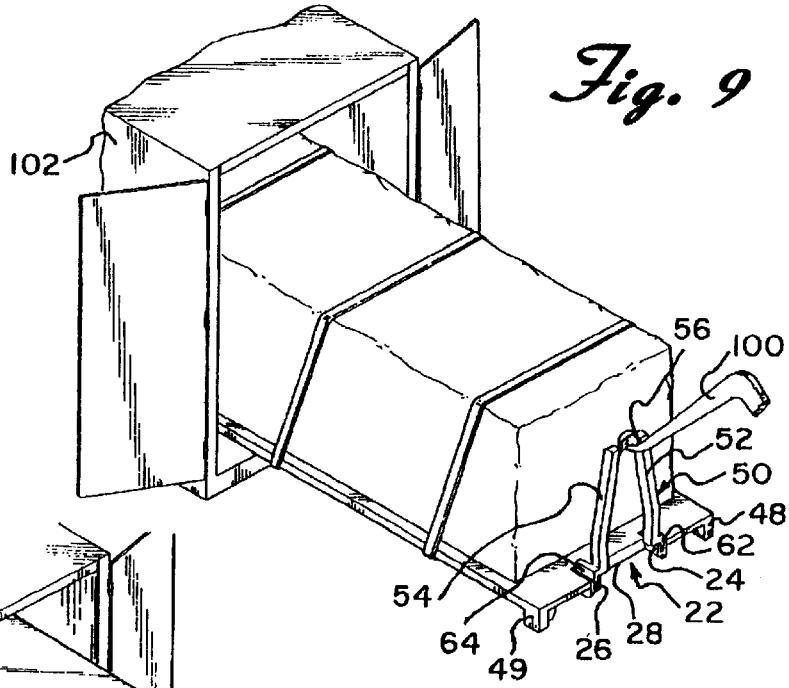
FIG. 9 is a perspective view showing a loaded pallet being inserted into a shipping container.

In order to facilitate an understanding of the principles associated with the foregoing device, its operation will now be briefly described. In use, the handle member 50 of the pallet 10 is placed in its upright position (FIG. 2). Articles are then loaded onto the top of the pallet. The articles are preferably covered and strapped to the pallet. Thereafter, the curved connecting segment 56 is grasped by a gripping member 100 which is attached to a conventional PLS truck of the type known in the art (FIG. 9). The first end 14 of the pallet 10 is lifted by the PLS truck so that the weight of the pallet 10 is placed on the curved segments 30 and 32. The PLS truck pulls the pallet 10 onto the support surface of the truck in the known manner and is backed so as to be positioned at the open end of a shipping container such as shown at 102 in FIG. 9. Thereafter, the PLS truck lowers the pallet until the smooth curved segments 30 and 32 rest on the floor of the shipping container. As the pallet is moved into the container, the curved segments 30 and 32 slide across the floor of the same until the pallet is properly positioned in the container. Obviously, the pallet is removed from the shipping container by reversing the above procedure.

Figure 8:
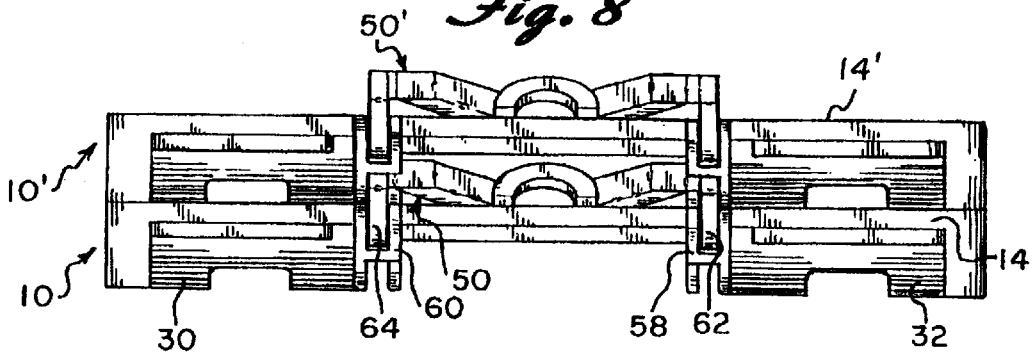
FIG. 8 is an end view showing two pallets stacked on top of one another.

Typically, a large number of pallets are utilized to transport goods into and out of shipping containers. When the pallets are not in use, it is desirable to stack them on top of one another so that they do not take up needed floor space. The pallets are preferably stacked in the following manner. The handle member 50' of one of the pallets 10' is placed in its inoperative or folded position. The tines of a fork lift are then inserted into the two fork lift openings in either of the elongated beams of the pallet 10'. The fork lift then raises the pallet and places the same on top of a different pallet 10 (FIG. 8). The handle of the lower pallet fits in between the elongated beams which extend downwardly from the upper pellet as shown in FIG. 8. The elongated beams of the upper pallet 10' rest on the upper surface of the lower pallet 10.

The adjacent pallets 10 and 10' are locked together as follows. The eyelets 78 and 80 on the second end 16 of one of the pallets 10 are placed in the upright configuration so that each of the pins which extend from the curved segments of the pallet 10' extend through a corresponding one of the eyelets 78 and 80 on the lower pallet 10. The first ends 14 and 14' of adjacent pallets may also be secured together by means of sliding bolts or the like. This procedure may be repeated until a stack 104 containing a desirable number of pallets is obtained (FIG. 10).

Figure 10:
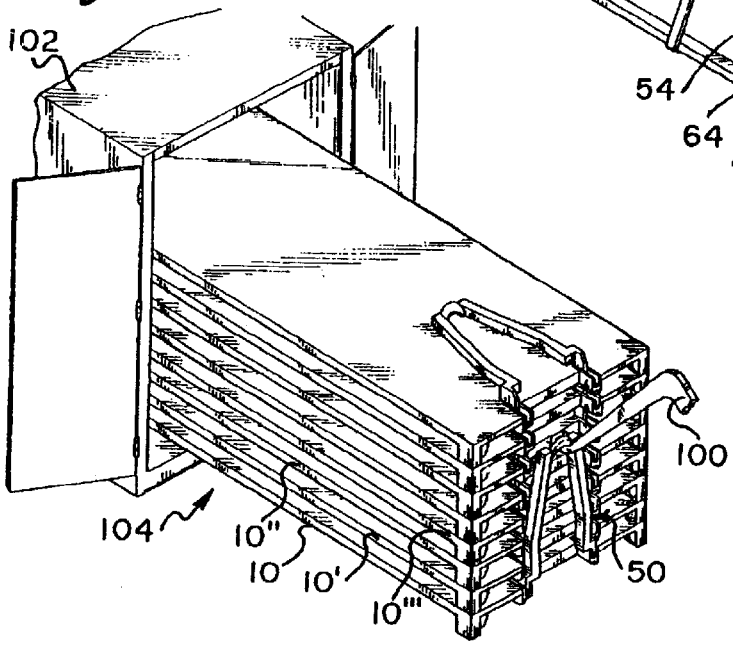
FIG. 10 is a perspective view of a stack of pallets being inserted into a shipping container.

If it is desired to transport a stack of pallets (for example to return them to the shipper) the handle member 50 of the lowermost or ultimate pallet 10 in the stack 104 is preferably locked in the upright position as shown in FIG. 10. The handle member 50 extends upwardly through recesses 22 in the penultimate pallet 10", the antepenultimate pallet 10'", etc. Maintaining the handle member 50 in its upright position provides means for the gripping member 100 of the PLS truck to grasp the handle member of the pallet 10 and push or pull the entire stack to a desired location.

The present invention may be embodied in other specific forms without departing from the spirit or essential attributes thereof and accordingly reference should be made to the appended claims rather than to the foregoing specification as indicating the scope of the invention.

What is claimed is:

1. A stackable pallet comprising:

a rectangular planar base member having a width and a length and including a first end, a second end, and two opposing sides;

a pair of spaced apart elongated beams extending downwardly from said base member, each of said beams extending throughout a substantial length of said base member, said base member being supported on said elongated beams, and a handle member pivotally secured to said base member adjacent said first end, said handle member being adapted to be pivoted from an inoperative position, wherein said handle member is folded on top of said base member, to an operative position, wherein said handle member extends upwardly from said base member, said handle member having a width which is less than the distance between said beams whereby when said handle member is in its inoperative position it can fit between the beams of a similarly constructed pallet stacked thereon.

2. The stackable pallet of claim 1 further wherein said base member has a recess extending into said first end of said base member, said recess being defined by two side edges and a transverse edge and wherein said handle member is pivotally secured to said side edges.

3. The stackable pallet of claim 2 wherein said handle member includes a pair of converging arms, each of said converging arms being pivotally secured to said base member adjacent a different one of said side edges of said recess, said pair of arms being joined by a connecting segment.

4. The stackable pallet of claim 1 wherein each of said beams includes at least two spaced apart openings therein.

5. The stackable pallet of claim 1 wherein said handle member has a predetermined thickness and wherein said elongated beams extend downwardly from said base member a distance which is at least as great as the thickness of said handle member.

6. The stackable pallet of claim 5 further including a pair of feet, each of said feet extending downwardly from a different one of said sides of said base member adjacent said first end thereof, said feet extending downwardly from said base member a distance equivalent to said distance said beams extend downwardly from the same.

7. The stackable pallet of claim 1 further including locking means for releasably locking said handle member in said operative position.

8. A stackable pallet comprising:

a rectangular planar base member having a width and a length and including a first end, a second end, and two opposing sides, said base member further having a recess extending into said first end of said base member, said recess being defined by two side edges and a transverse edge;

a pair of spaced apart elongated beams extending downwardly from said base member, each of said beams extending throughout a substantial length of said base member, said base member being supported on said elongated beams, and a handle member pivotally secured to said base member adjacent said side edges of said recess, said handle member being adapted to be pivoted from an inoperative position, wherein said handle member is folded on top of said base member, to an operative position, wherein said handle member extends upwardly from said base member, said handle member having a width which is less than the distance between said beams whereby, when said handle member is in its inoperative position, it can fit between the beams of a similarly constructed pallet stacked thereon.

9. The stackable pallet of claim 8 wherein said handle member includes a pair of converging arms, each of said converging arms being pivotally secured to said base member adjacent a different one of said side edges on said recess, said pair of arms being joined by a connecting segment.

10. The stackable pallet of claim 8 wherein each of said beams includes at least two spaced apart openings therein.

11. The stackable pallet of claim 8 wherein said handle member has a predetermined thickness and wherein said elongated beams extend downwardly from said base member a distance which is at least as great as the thickness of said handle member.

12. The stackable pallet of claim 11 further including a pair of feet, each of said feet extending downwardly from a different one of said sides of said base member adjacent said first end thereof, said feet extending downwardly from said base member a distance equivalent to said distance said beams extend downwardly from the same.

13. The stackable pallet of claim 8 further including locking means for releasably locking said handle member in said operative position.

14. A stackable pallet system comprising:

a plurality of pallets, each of said pallets including:

a rectangular planar base member having a width and a length and including a first end, a second end, and two opposing sides, said base member further having a recess extending into said first end of said base member, said recess being defined by two side edges and a transverse edge;

a pair of spaced apart elongated beams extending downwardly from said base member, each of said beams extending throughout a substantial length of said base member, said base member being supported on said elongated beams, and a handle member pivotally secured to said base member adjacent said side edges of said recess, said handle member being adapted to be pivoted from an inoperative position, wherein said handle member is folded on top of said base member, to an operative position, wherein said handle member extends upwardly from said base member;

said plurality of pallets being adapted to be positioned on top of one another to form a stack having a lowermost ultimate pallet, a penultimate pallet, and an antepenultimate pallet, said handle members of said penultimate and antepenultimate pallets being positioned in said inoperative position, said elongated beams of said antepenultimate pallet contacting said base member of said penultimate pallet and said handle member of said penultimate pallet being positioned between said elongated beams of said antepenultimate pallet, said handle member of said ultimate pallet being placed in said operative position and extending upwardly within the recesses in said penultimate and antepenultimate pallets.

15. The stackable pallet system of claim 14 further including means for connecting each of said pallets to an adjacent pallet in said stack.

*16. A stackable pallet system comprising:*

*a plurality of pallets, each of said pallets including:*

*a substantially rectangular planar base member having a width and a length and including a first end, a second end, and two opposing sides;*

*a pair of spaced apart elongated beams extending downwardly from said base member, each of said beams extending throughout a substantial length of said base member, said base member being supported on said elongated beams, and*

*a handle member pivotally secured to said base member adjacent said first end, said handle member being adapted to be pivoted from an inoperative position, wherein said handle member is folded on top of said base member, to an operative position, wherein said handle member extends upwardly from said base member;*

*said plurality of pallets being adapted to be positioned on top of one another to form a stack having a lowermost ultimate pallet, a penultimate pallet, and an antepenultimate pallet, said handle members of said penultimate and antepenultimate pallets being positioned in said inoperative position, said elongated beams of said antepenultimate pallet contacting said base member of said penultimate pallet and said handle member of said penultimate pallet being positioned between said elongated beams of said antipenultimate pallet, said handle member of said ultimate pallet being placed in said operative position and extending upwardly.*

*17. The stackable pallet system of claim 16 further including means for connecting each of said pallets to an adjacent pallet in said stack.*

* * * * *